(12) United States Patent  (10) Patent No.: US 8,456,040 B2
Allard et al.                (45) Date of Patent: Jun. 4, 2013

(54) REFRIGERATOR MODULE UTILITIES ENABLED VIA CONNECTION

(71) Applicant: Whirlpool Corporation, Benton Harbor, MI (US)

(72) Inventors: Paul B. Allard, Stevensville, MI (US); Robert Ryan Bradley, Granger, IN (US); James W. Kendall, Mt. Prospect, IL (US); Steven J. Kuehl, Stevensville, MI (US); Douglas D. Leclear, Benton Harbor, MI (US); Alan S. Lucas, Evansville, IN (US); Andrew M. Tenbarge, St. Joseph, MI (US); John J. Vonderhaar, St. Joseph, MI (US); Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/644,258

(22) Filed: Oct. 3, 2012

(65) Prior Publication Data

US 2013/0026855 A1    Jan. 31, 2013

Related U.S. Application Data

(63) Continuation of application No. 12/539,651, filed on Aug. 12, 2009, now Pat. No. 8,299,656, which is a continuation-in-part of application No. 12/402,559, filed on Mar. 12, 2009, now Pat. No. 8,176,746.

(60) Provisional application No. 61/035,775, filed on Mar. 12, 2008.

(51) Int. Cl.
*H02B 1/20* (2006.01)
*B67D 9/00* (2010.01)

(52) U.S. Cl.
USPC .............. 307/154; 307/38; 307/39; 307/139

(58) Field of Classification Search
USPC ..................................... 307/38, 39, 139, 154
See application file for complete search history.

(56) References Cited

U.S. PATENT DOCUMENTS

| 7,197,888 | B2 * | 4/2007 | LeClear et al. | 62/186 |
| 7,661,459 | B2 * | 2/2010 | Wesley et al. | 165/11.1 |
| 2008/0120187 | A1 * | 5/2008 | Wesley et al. | 705/15 |
| 2009/0314889 | A1 * | 12/2009 | Baatz et al. | 244/118.5 |

* cited by examiner

*Primary Examiner* — Adi Amrany
(74) *Attorney, Agent, or Firm* — Kirk W. Goodwin; Price Heneveld LLP

(57) ABSTRACT

A connection system for connecting an encoded domestic appliance feature module to a utility source and transferring a plurality of utilities between the encoded feature module and the utility source. The connection system includes a utility source that has a coupler capable of removably engaging an encoded domestic appliance feature module to the utility source. Also included is at least one encoded domestic appliance feature module that independently supplies one or more functionalities. Further included is an interface between the utility source and the feature module, where the interface includes a detection and recognition device that operates to detect when the encoded feature module is connected to the utility source, where one or more predetermined utilities are transferred between the utility source and the feature module based upon which feature module is connected to the utility source, and where the detection and recognition device may be a reed switch, a DIP switch, and a comparator circuit.

20 Claims, 13 Drawing Sheets

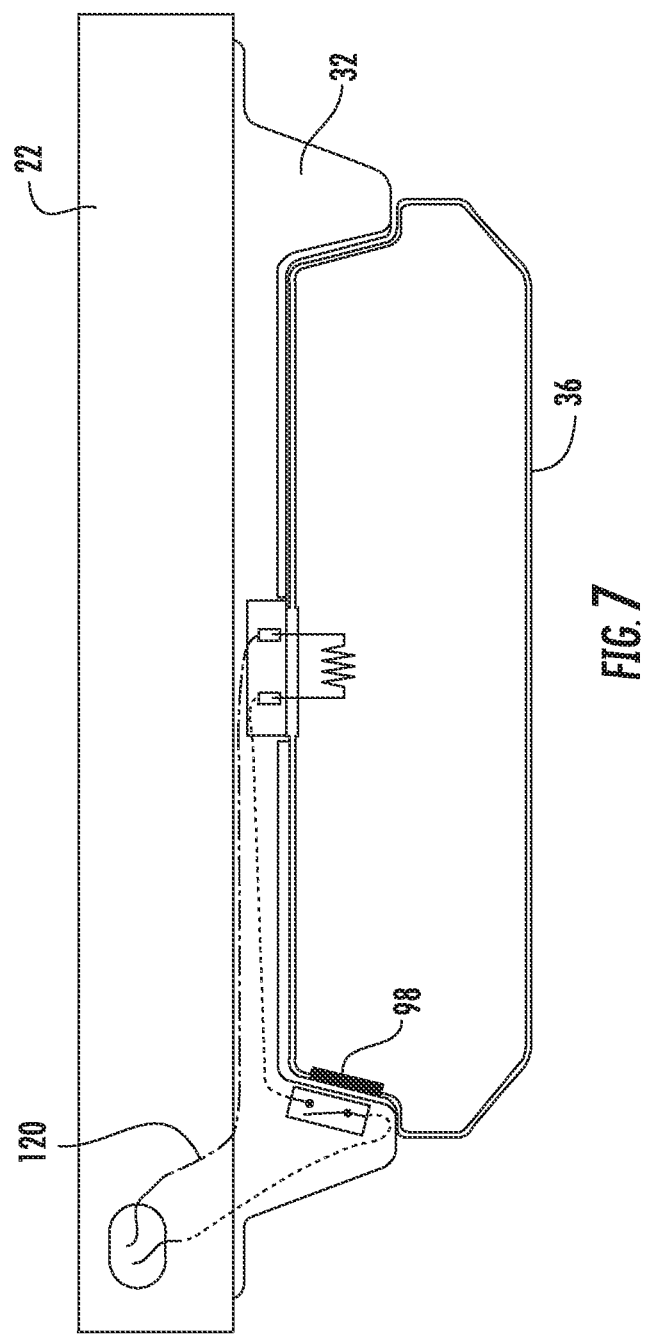

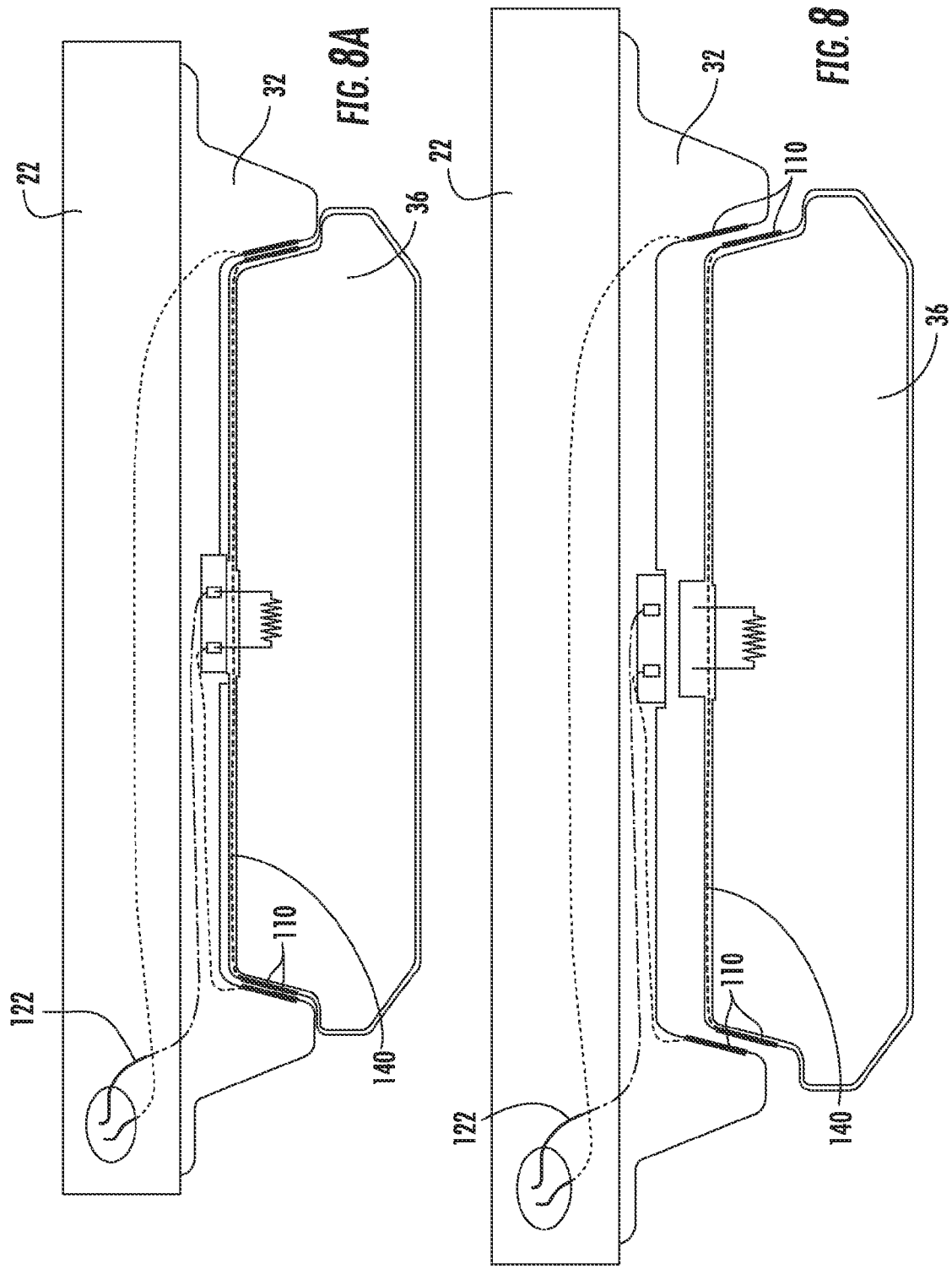

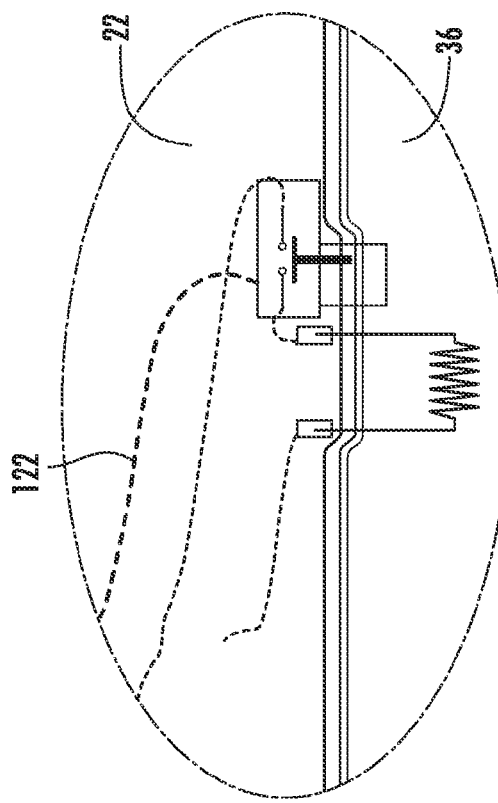
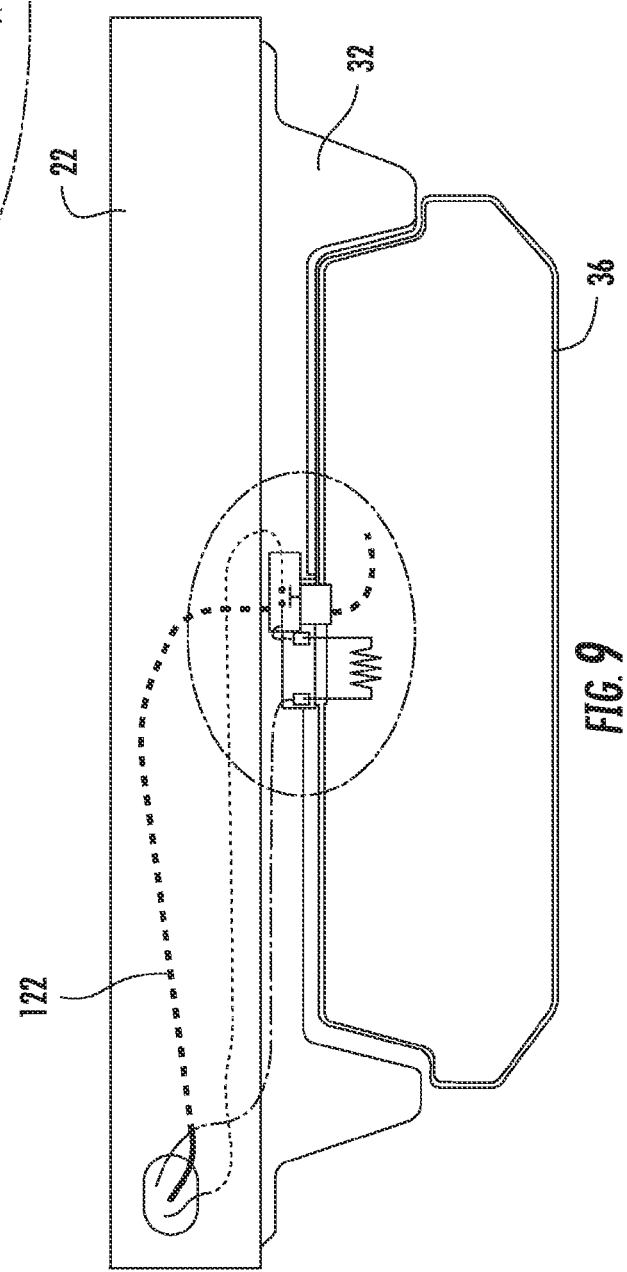

REFRIGERATOR MODULE UTILITIES ENABLED VIA CONNECTION

CROSS-REFERENCE TO RELATED APPLICATIONS

This application is a continuation application of U.S. patent application Ser. No. 12/539,651, entitled "Feature Module Connection System", filed on Aug. 12, 2009, now U.S. Pat. No. 8,299,656 issued on Oct. 30, 2012, the entire disclosure of which is hereby incorporated by reference. U.S. patent application Ser. No. 12/539,651 is a continuation-in-part of U.S. patent application Ser. No. 12/402,559, entitled "VACUUM FOOD PRESERVATION SYSTEM," filed on Mar. 12, 2009, the entire disclosure of which is hereby incorporated by reference. U.S. patent application Ser. No. 12/402,559 claims priority under 35 U.S.C. §119(e) to, and the benefit of, U.S. Provisional Patent Application No. 61/035,775, entitled "REFRIGERATOR WITH SPACE MANAGEMENT MODULES," filed on Mar. 12, 2008, the entire disclosure of which is hereby incorporated by reference.

BACKGROUND OF THE INVENTION

Refrigerators are available in many styles, but the most common styles include both a refrigerator compartment and a freezer compartment, which may be side-by-side or one on top of the other. Often, refrigerator features such as ice making, ice crushing, water dispensing, precise temperature and/or humidity control, vacuum packaging, thawing, and fast chilling are available. All of these features require some type of utility, such as water, chilled air or mechanical power to provide the benefit.

Newer concepts in refrigeration have included modular units which fit within a refrigerated cabinet in order to provide the advantageous features above. Such modules are themselves a great convenience for the users of the refrigerators so equipped.

Accordingly, an apparatus is desired having the aforementioned advantages in solving and/or making improvements on the aforementioned disadvantages.

SUMMARY OF THE INVENTION

One aspect of the present invention is to provide a connection system for connecting an encoded domestic appliance feature module to a utility source that transfers a plurality of utilities with the encoded domestic appliance feature module. The connection system includes a utility source having a coupler that is capable of removably engaging an encoded feature module to the utility source. Also included is at least one encoded feature module that independently supplies one or more functionalities. Further included is an interface between the utility source and the encoded feature module, where the interface has a detection and recognition device that operates to detect when the encoded feature module is connected to the utility source, and also where a plurality of predetermined utilities are transferred between the utility source and the feature module based upon which feature module is connected to the utility source.

Another aspect of the present invention is to provide an appliance system. The appliance system includes a host appliance that is capable of transferring a plurality of utilities. Also included is an encoded domestic appliance feature module that is capable of supplying at least one added functionality to the host appliance that is not natively associated with the appliance when the appliance is free of engaged feature modules, and where the feature module is capable of being removably engaged with a surface of the host appliance. Engagement of the feature module to the appliance allows the feature module to transfer at least one or a plurality of predetermined utilities with the appliance. Further included is a connector system that facilitates the module to host appliance engagability. The connector system includes a coupler that is capable of engaging the module to the appliance, as well as an interface between the appliance and the feature module, where the interface includes a detection and recognition device that is capable of identifying individual feature modules when the feature module is engaged to the appliance, and where identification of the engaged feature module prompts the appliance to transfer at least one predetermined utility with the feature module.

Yet another aspect of the present invention is a method of providing user-selected features to an appliance. The method includes providing a utility supply source, such as an appliance that is capable of storing a plurality of utilities; an encoded domestic appliance feature module that is configured to be removably engaged to a surface of the appliance and is capable of supplying at least one user-selected feature and transferring the plurality of predetermined utilities; and a connector that includes a coupling mechanism that allows for removably engaging the module to the appliance. The method also includes the step of engaging a surface of the appliance and the encoded domestic appliance feature module, such that the appliance and the encoded feature module are removably engaged with one another using the connector and are operably connected at an interface. The interface has a detection and communication device that allows for the feature module to communicate to the appliance whether the encoded feature module is connected to the appliance and which of a plurality of predetermined utilities are to be transferred between the encoded feature module and the appliance when the encoded feature module is engaged to the appliance. The method further includes the step of transferring the plurality of predetermined utilities identified by the engagement of the encoded feature module between the appliance and the encoded feature module to provide the user-selected features that are capable of being supplied by the encoded feature module.

A further aspect of the present invention is to provide a connection system for connecting an encoded domestic appliance feature module to a utility source and transferring a plurality of utilities between the encoded feature module and the utility source. The connection system includes a utility source that has a coupler capable of removably engaging an encoded domestic appliance feature module to the utility source. Also included is at least one encoded domestic appliance feature module that independently supplies one or more functionalities. Further included is an interface between the utility source and the feature module, where the interface includes a detection and recognition device that operates to detect when the encoded feature module is connected to the utility source, where one or more predetermined utilities are transferred between the utility source and the feature module based upon which feature module is connected to the utility source, and where the detection and recognition device may be a reed switch, a DIP switch, and a comparator circuit.

These and other aspects, objects, and features of the present invention will be understood and appreciated by those skilled in the art upon studying the following specification, claims, and appended drawings.

BRIEF DESCRIPTION OF DRAWINGS

FIG. 7 is an elevational top view of the feature module engaged to the utility source, illustrating a reed switch electrical connection;

FIG. 8 is an elevational top view of the feature module just prior to engagement to the utility source via force fitting contacts;

FIG. 8A is an elevational top view of the feature module engaged to the utility source via force fitting contacts;

FIG. 9 is an elevational top view of the feature module engaged to the utility source, illustrating a fluid coupling;

FIG. 9A is an enlarged view of a section of FIG. 9, illustrating a fluid coupling;

DETAILED DESCRIPTION OF THE PREFERRED EMBODIMENTS

Figure 1:
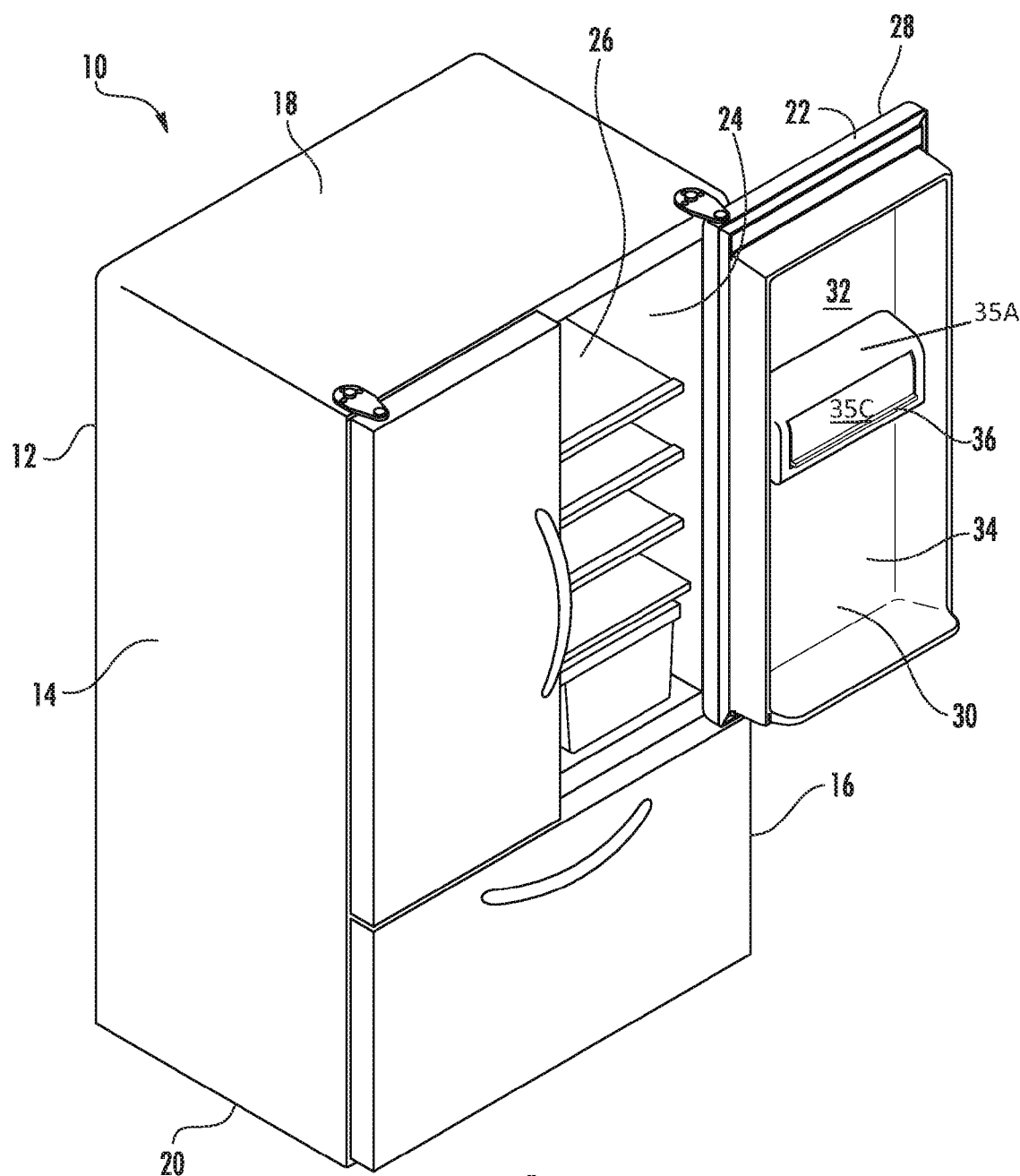
FIG. 1 is an upper left perspective view of the appliance system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates an appliance system with a rear wall section 12, a first side wall section 14, a second side wall section 16, a top 18, a bottom 20, and at least one appliance door 22 providing access to the refrigerator section 24 where the rear wall section, the first side wall section, the second side wall section, the top and bottom and the appliance door define an appliance interior. The refrigerator section 24 within the appliance interior may have the same or a smaller volume than the overall interior of the appliance, i.e., the appliance may be solely a refrigerator or be an appliance having both a refrigerator section and another section, such as a freezer section. The door(s) 22 of the appliance 10 have an exterior surface 28 and an interior surface 30 typically having a door liner 32. The liner 32 is typically formed with a cavity or pocket 34 for receiving one or more feature modules with the same or different features. The feature module 36 of the present invention may, for example, produce a modified atmosphere to preserve food such as that disclosed in commonly owned U.S. patent application Ser. Nos. 12/343,682 and 12/343,690, the disclosures of which are hereby incorporated by reference in their entireties.

The illustrated appliance 10 is shown with the door hingably attached to the appliance 10. The appliance door 22 covers at least a portion of the refrigerator section 24 that lies within the appliance interior 26, and as shown, the door 22 is in an opened position. The appliance door 22 has an exterior surface 28 and an interior surface 30, with the interior surface 30 exposed in the opened position. The door liner 32 at least partially covers, but more typically covers all or substantially all of the interior surface 30 of the appliance door 22. An interface between the feature modules and the appliance door 22, such as interconnecting tabs and grooves or a magnetic engagement, allows for quick and easy installation docking without the use of tools. Differently sized feature modules 36 may be accommodated through the use of spacer systems that engage the interior of the appliance door 22 and shorten the lateral distance that the feature module 36 must traverse to engage the spacer. The spacer, when used would mimic a smaller mounting distance/door pocket or cavity 34 and similarly have an interface such as a tabular on groove mating or magnetic engagement.

The modular construction and interchangeability of feature modules 36 minimizes manufacturing costs and allows the feature module 36 to be original equipment or after-market components retro-fit into appliances, after the initial purchase and installation of the appliance 10 in a consumer's home. This interchangeability provides flexibility and improved food preservation and storage for the consumer, improved choice of feature modules 36 with opportunity to upgrade or replace without replacing the whole refrigerator based upon lifestyle or life stage changes, and allows the consumer to take advantage of new technology improvements and new features as new feature modules 36 are designed and developed.

A feature module 36 according to one embodiment of the present invention is removably engaged with the appliance door 22 and sized to fit within the door liner 32 typically within the cavity or pocket 34 of the door liner 32. As discussed above, engagement of the feature module 36 with the door 22 occurs by engaging the feature module 36 with the appliance door 22 in any convenient manner, such as by interlocking tabs, a small support shelf or floor, or other mechanical means or a magnetic arrangement may also be used. For example, force fitting contacts 110 that are capable of securing the feature module in place, while also providing a conductive path 140 to complete an electrical circuit and thus enabling a utility supply pathway 122 (FIG. 8). When appropriate for the feature module 36, engagement of the feature module 36 to the appliance door 22 can automatically couple electrical, gas, and/or fluid lines in the door 22 and in the feature module 36 so as to provide functional features to the feature module 36. Additionally, a push switch may be employed to enable the flow of utilities via control signal or electrical power to a flow control device such as a valve or pump (FIG. 9). The appliance door 22 typically includes a feature module 36 engaging connector 38 for providing the electrical power to the feature module 36. The feature module engaging connector 38 may also provide one or more utilities such as conditioned (heated, chilled, filtered, purified, or combinations thereof) fluids and air to the feature module 36. Conceivably, a separate utility connector could be used such that power or other utility is serviced differently from the other utility or utilities.

Figure 2:
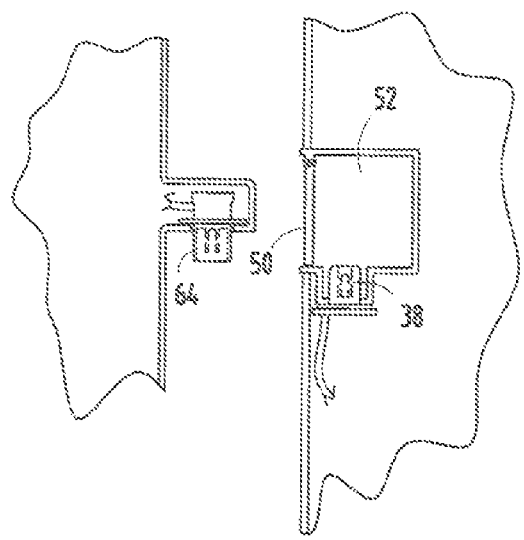
FIG. 2 is an elevational side view of a feature module just prior to engaging a refrigerator door.
Figure 2A:
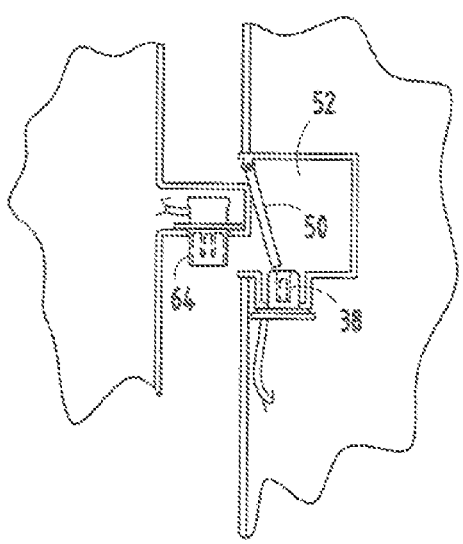
FIG. 2A is an elevational side view of the feature module engaging the refrigerator door.
Figure 2B:
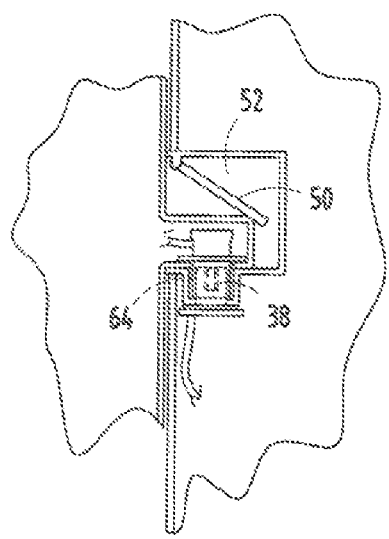
FIG. 2B is an elevational side view of the feature module engaged with the refrigerator door.
Figure 2C:
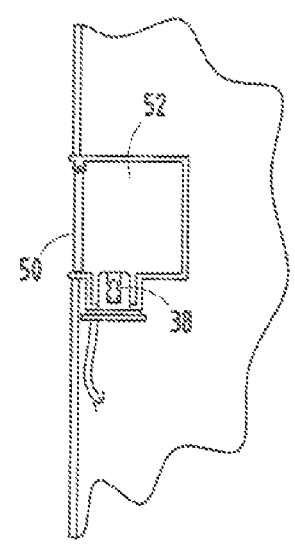
FIG. 2C is an elevational side view of a refrigerator door port area after removal of the feature module.

The door liner 32 may provide the ability to engage a plurality of feature modules 36 to the appliance 10. FIGS. 2-2C generally illustrate the engagement of a feature module 36 and feature module engaging connector 38 to an appliance door 22. Typically, a spring biased connection port cover 50 is hingably engaged with the door liner 32 or appliance door 22 such that when a feature module is not engaged with the appliance door, the connector with the port area 52, typically a female connector in the door liner 32 for engaging the feature module, is protected against debris from the food or other items stored in the appliance 10 that would potentially block or hamper operable connection of the feature module. Alternatively, rather than a hinged door protecting the port area 52, a removable cover may be fastened to the liner 32. The removable cover may be fastened by screws, bolts, clipping equipment, or any other suitable fastener. The removability of the cover allows a user to store the cover while the feature module is engaged to the door 22 and fastening of the cover to the door upon the absence of the feature module. In another embodiment, the cover can be slidable along a track or retract to provide access to the port area 52.

Furthermore and alternatively, the door 22 or other mounting surface may employ the "male" connector with the connector protruding therefrom and a "female" type connector employed on the feature module. In this embodiment, a plate over an access cavity on the liner is removed, thereafter a connector support member is engaged to the liner or other appliance surface and the feature module engaging connector is engaged to the connector support. Typically, the connector support is a trough-like, typically U-shaped, structure having an upper perimeter, a floor and side walls around at least a portion of the floor that define the upper perimeter. The feature module engaging connector is typically seated within the area defined by the side walls, most typically on the floor of the connector support member.

Figure 6:
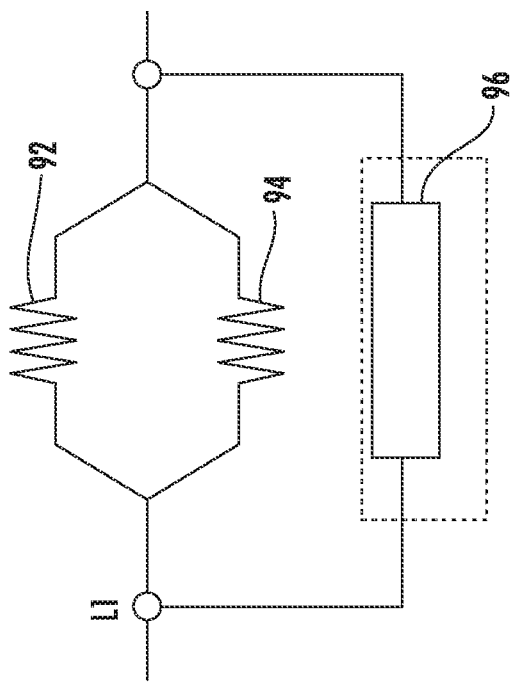
FIG. 6 is a schematic view of an electrical circuit having two resistors in parallel which produce a combined resistance evaluated by a comparator circuit.
Figure 5:
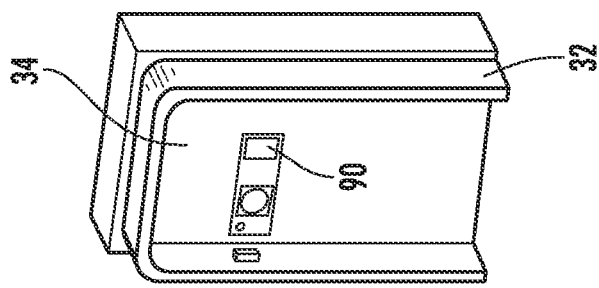
FIG. 5 is a perspective view of a feature module having an electrical contact that produces a signature resistance, illustrated prior to engaging a utility source.

While a push switch as discussed above may be used, alternative electrical engagements of the feature module with the appliance door may be used instead of, or in addition to, the push switch. The feature module may be provided with electrical contacts 90 that are engageable with electrical contacts of the appliance when the devices are coupled together (FIG. 5). Electrical contacts 90 may be connected through a known signature resistance 92, which may vary from one feature module to another to provide coded information relating to the type or characteristics of the feature module. The signature resistance 92 may be connected in parallel with the electrical load 94 of the electrical components of the feature module (FIG. 6). More particularly, the electrical load is the system resistance effectively provided by components of the feature module, such as a motor and/or other operational circuitry. The signature resistance may be substantially smaller than the resistance of the electrical load so that the combined resistance will be substantially the same as the signature resistance. For example, if the operational circuit has an electrical load offering a resistance of 200 ohms, a signature resistance of 7 ohms may be provided in parallel, so that the signature resistance and the electrical load together presents a resistance of a little less than 7 ohms across the electrical contacts.

The appliance interface may include a feature module recognition device having a comparator circuit or other decision making circuit 96 connectable to the resistances to measure and evaluate the combined resistance and also thereby determine the type of feature module 36 being connected at the time that a given feature module is connected. The module recognition device may then selectively provide power to the supply line or otherwise selectively permit the flow of utility from the appliance to the feature module 36, or from the feature module 36 to the appliance 10 that is appropriate for the identified feature module. The signature resistance will have minimal effect on the operation of the electrical components of the feature module 36.

Alternatively, the module recognition device may be a reed switch provided in the appliance door 22 for activation by a magnet imbedded in the side wall of the feature module 36 so as to complete an electrical circuit when the feature module 36 docks into the door pocket (FIG. 7). Contact pads 98 on the appliance door 22 and on the feature module 36 that complete the electrical circuit when the feature module 36 is mounted in the door liner 32 may also be employed. Completion of such an electrical circuit would selectively permit the supply or transfer of utility from the appliance 10 to the feature module 36, or vice versa, similar to the utility transfer described above (FIG. 8). When appropriate for the feature module 36, engagement of the feature module 36 to the appliance door 22 can automatically couple electrical, gas, and/or fluid lines in the door 22 and in the feature module 36 so as to provide functional features to the feature module 36 which are enabled to be transferred via depression of a push switch (FIG. 9).

Figure 10:
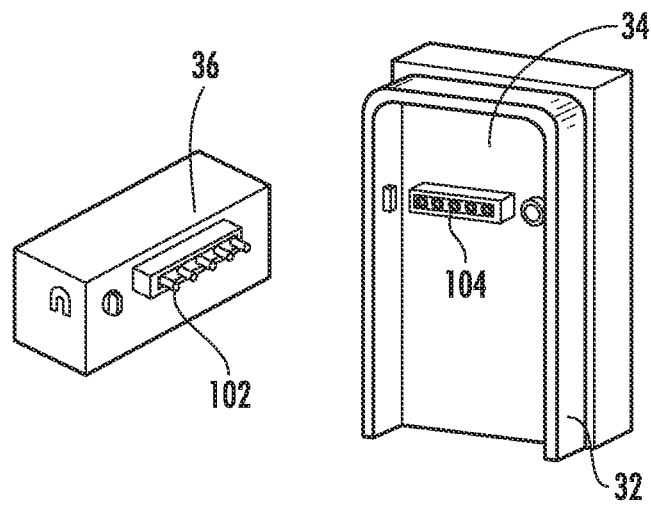
FIG. 10 is a perspective view of the feature module having a DIP switch connection to the utility source.
Figure 11:
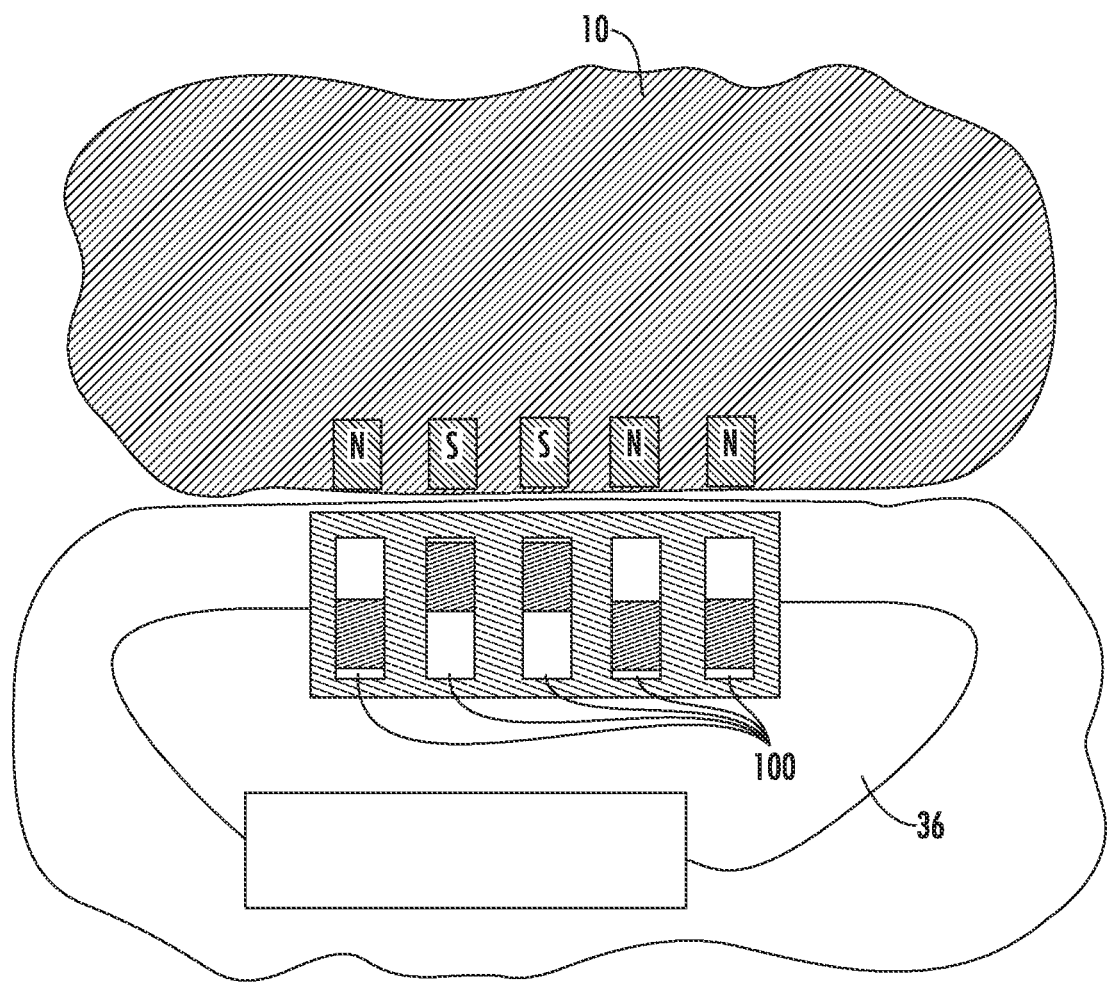
FIG. 11 is an elevational top view of the DIP switch engagement to the utility source.
Figure 12:
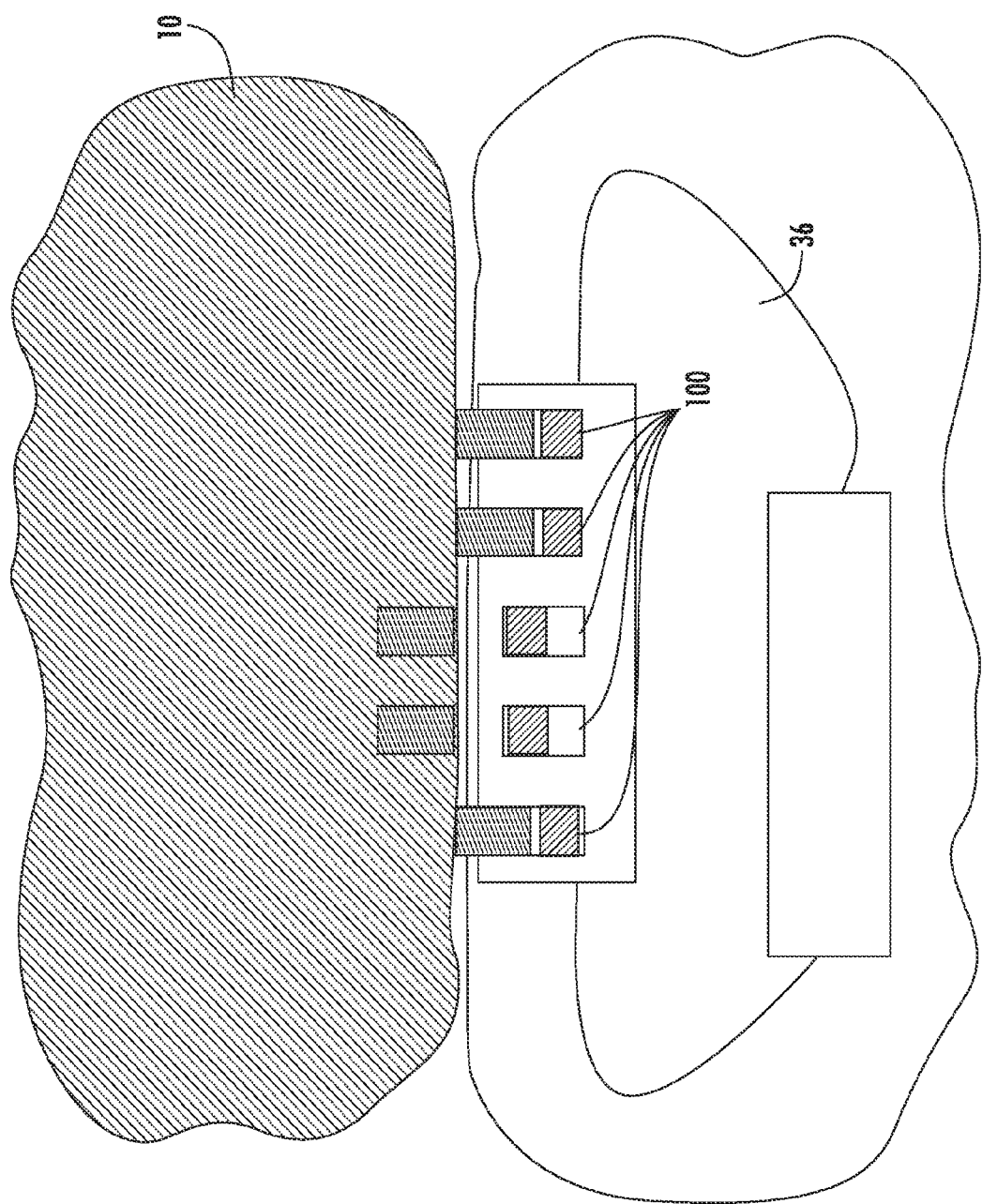
FIG. 12 is an elevational top view of the DIP switch engagement to the utility source, illustrating a series of reed switches.

A DIP switch may be employed as the module recognition device (FIGS. 10-12). The DIP, dual in-line package, switch will typically include a plurality of switches 100, each of which may be positioned in one or more, but typically two settings, as well as a plurality of socket pins 102. This type of switch is designed to be used on a printed circuit board along with other electronic components. The appliance typically includes a plurality of pin sockets 104 to receive the dip switch package. DIP switches are an alternative to jumper blocks. A DIP switch alternative provides the ability to set the switches of the package to specific setting combinations which will customize the utilities supplied to the engaged feature module, based upon the specific requirements of that module. The switches 100 are typically manually set to correspond to various combinations, however it is conceivable that the switches may function as a plurality of reed switches. In the reed switch example, the utility source and/or the feature module may include magnets which are capable of triggering the switches to various positions, thereby establishing a combination that may be identifiable by the utility source.

The above-described connection examples, when employed, allow the appliance, or utility supply source, such as a wall mounted feature module engaging station or countertop stand, to identify specific feature module connections, thereby ensuring that the appropriate utility is supplied to a feature module based upon the utilities needed by the feature module. The utility provided may be, but is not limited to, electrical power, mechanical power, as well as gases, fluids such as conditioned (e.g., heated, cooled, and/or filtered water), and solids. The required utility will vary based upon the application and functional properties of the connected feature module. The structural components that identify which feature module is connected to the appliance 10 facilitates the provision of such utility.

Figure 13:
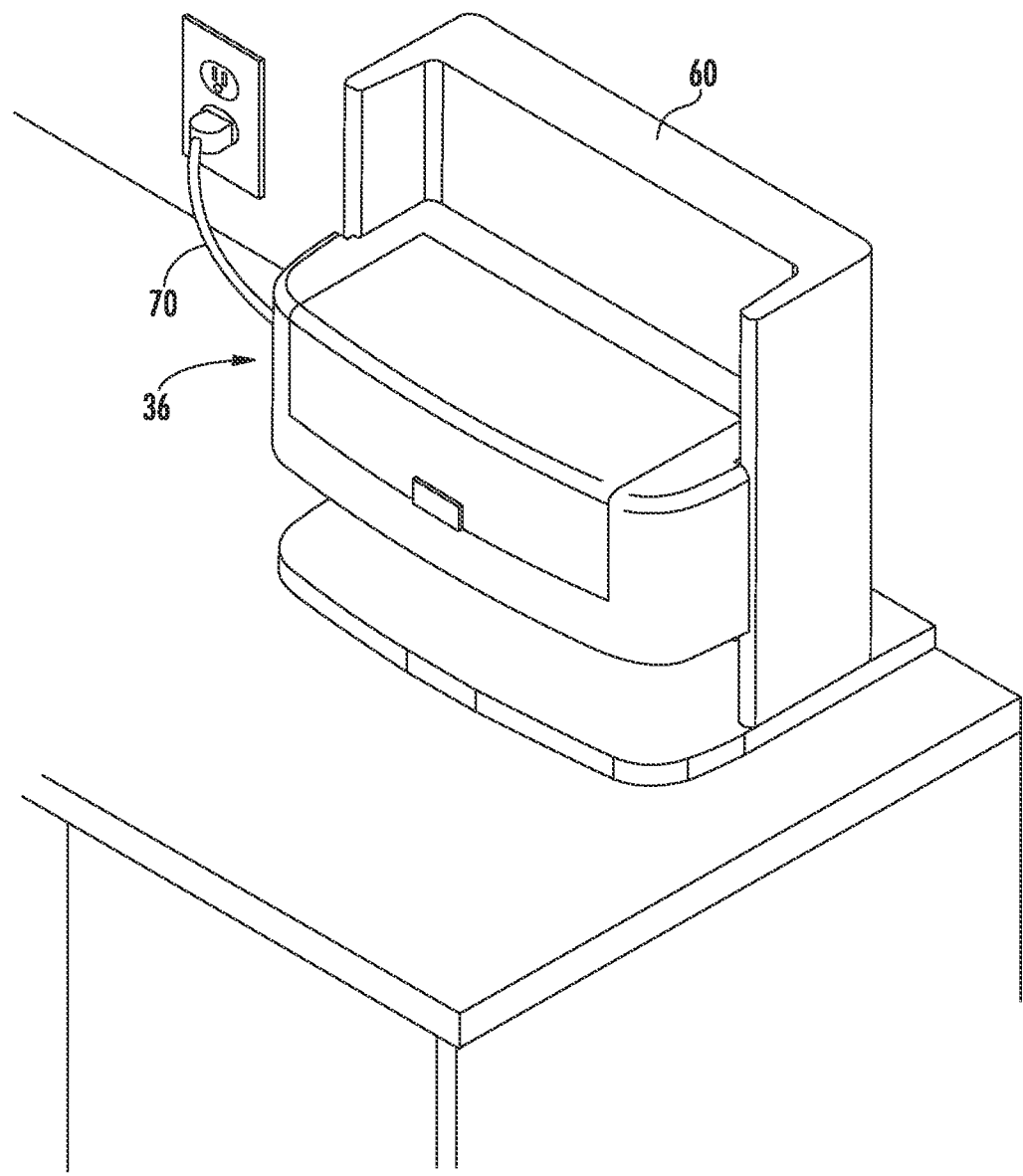
FIG. 13 is an elevational side, cross-sectional view of the feature module engaged to the countertop stand illustrating the portability of the feature module.
Figure 14:
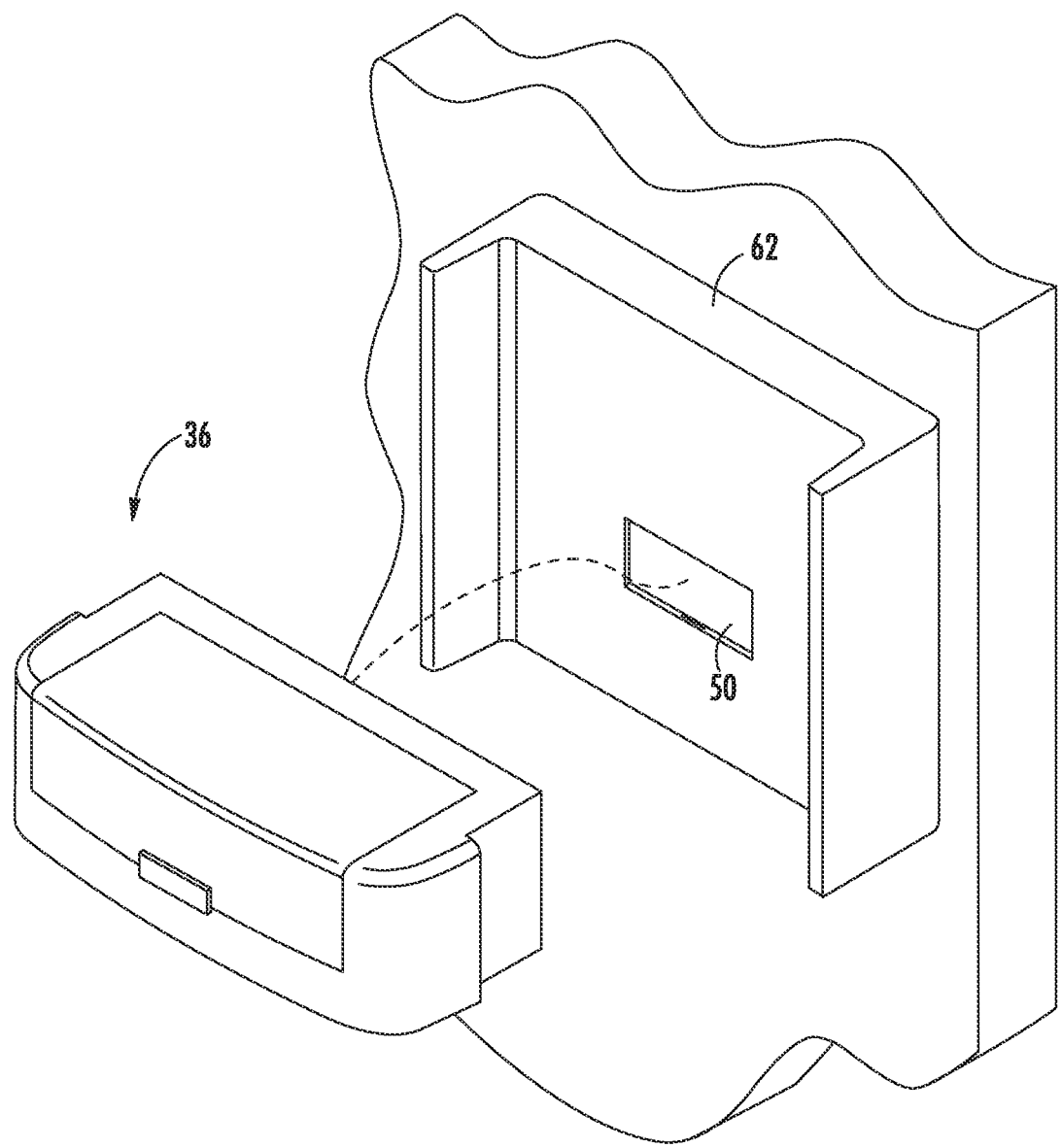
FIG. 14 is an upper right perspective view of the feature module prior to engaging a mounted wall bracket illustrating the portability of the feature module.

In addition to being engaged with the exterior surface or the interior surface of the door of an appliance, the feature module of the present invention may optionally be engaged with a countertop stand 60 and/or a wall bracket 62 (FIGS. 13-14). The countertop stand 60 and wall bracket 62 would typically also include a feature module engaging connector 38 within a port area 52 protected by a spring-biased port cover 50 alternatively the connector support member as discussed above may be utilized. The feature module 36 typically draws electrical power and optionally other utilities. Conceivably, the feature module could also be engaged to any other surface of the appliance, such as a side, top, or even back portion of the appliance. Engagement to these surfaces would be accomplished in the manner previously discussed and utility may be drawn in a similar fashion. Of course, if the feature module would be engaged to the top of an appliance the connector of the feature module would typically be spaced on the bottom of the feature module to facilitate easy attachment of the feature module to the appliance. Similarly, if the feature module were engaged to a side of the appliance, the connectors on both the appliance and the feature module would be on a side. Conceivably, multiple connectors on a given module may be used.

Figure 3:
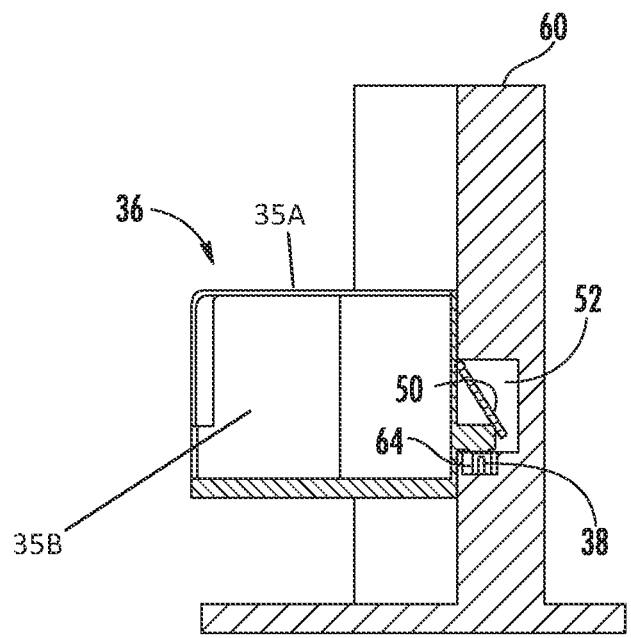
FIG. 3 is an elevational side, cross-sectional view of the feature module prior to engaging a countertop stand illustrating the portability of the feature module.
Figure 4:
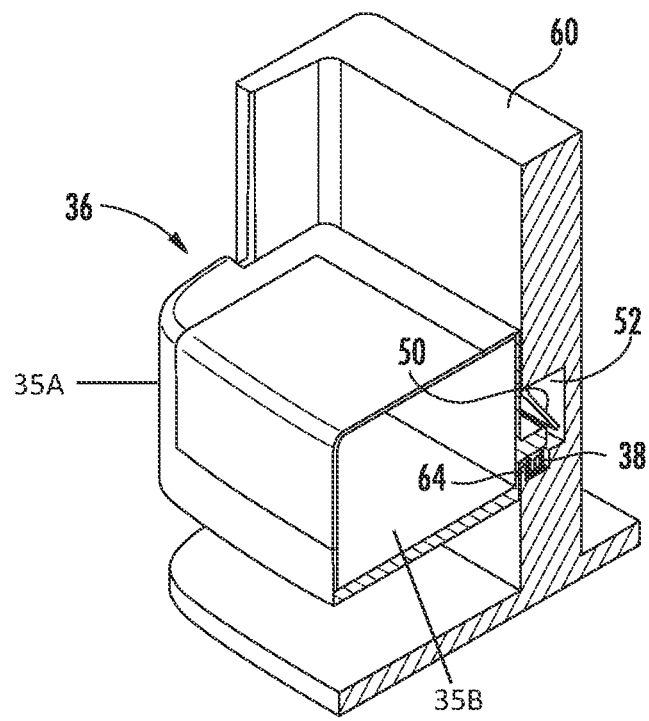
FIG. 4 is an upper right perspective, cross-sectional view of the feature module prior to engaging the countertop stand illustrating the portability of the feature module.

When a countertop stand 60 is utilized, the stand typically includes a base and an upright section that substantially mimics a pocket or cavity of a refrigerator or other appliance door liner (FIG. 13). The feature module 36 typically engages the sides of the countertop stand 60 for retaining the feature module in place via interlocking tabular members, and/or a pin type arrangement or other mechanical means or magnetically as described above (FIGS. 3-4). Typically, as when the feature module engages the interior door of the appliance, the countertop stand 60 or wall bracket 62 (FIG. 14) includes a spring biased hinged cover 50 that inwardly pivots when the feature module's connection plug (typically male-type) is inserted therein. The cover 50, as discussed before, prevents debris and other materials from contacting the feature module engaging connector of the countertop stand 60 and/or wall bracket 62. The feature module 36 typically contains a generally L-shaped connection plug 64 (male-type) that is inserted into the cavity containing the feature module engaging connector 38 thereby moving the cover 50 inward about the hinge. The feature module 36 is engaged with the feature module engaging connector 38 when the feature module is tilted into position and dropped into engagement with the countertop stand 60, wall bracket 62, or appliance door 22 (FIGS. 2-2C). The countertop stand 60 itself may draw electrical power from a separate outlet or directly from the appliance via an umbilical utility cord 70 type attachment. The utility cord 70 from the appliance could also conceivably supply cold air or liquid (such as conditioned water) or other utilities to the feature module.

Figure 15:
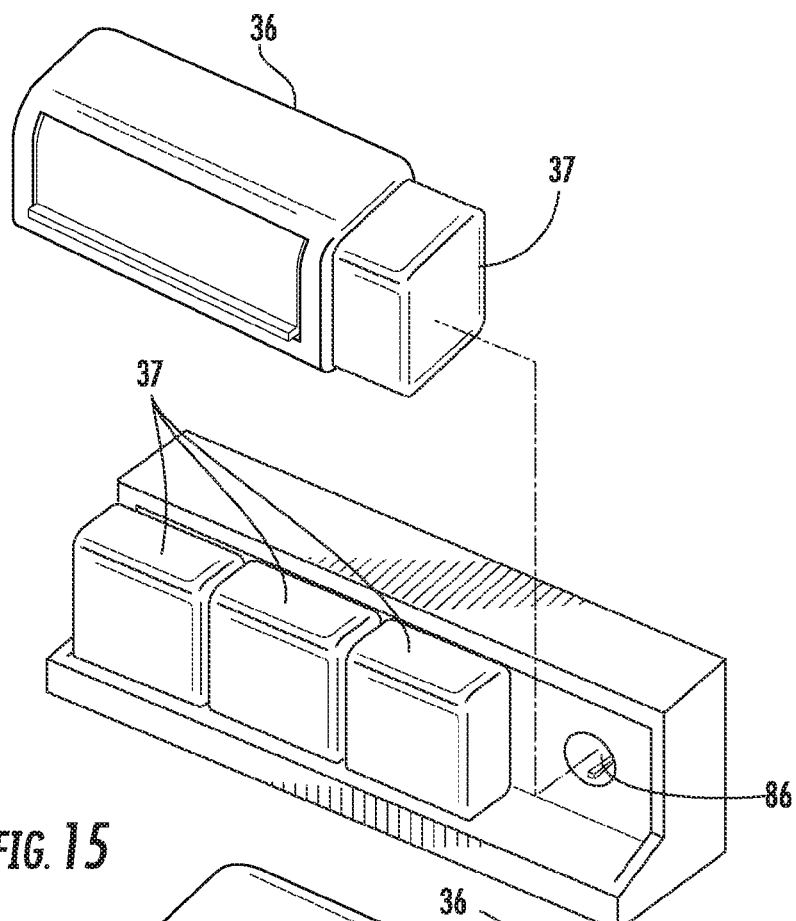
FIG. 15 is an upper right perspective view of the feature module engaged with a utility supply module and a charging station for at least one utility supply module.
Figure 16:
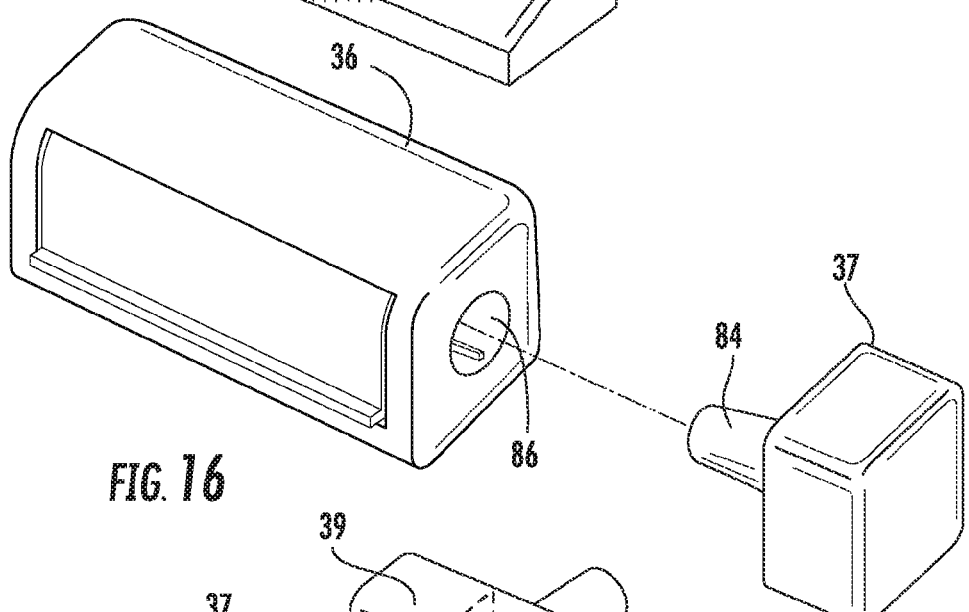
FIG. 16 is an upper right perspective view of the utility supply module prior to engaging the feature module.
Figure 17:
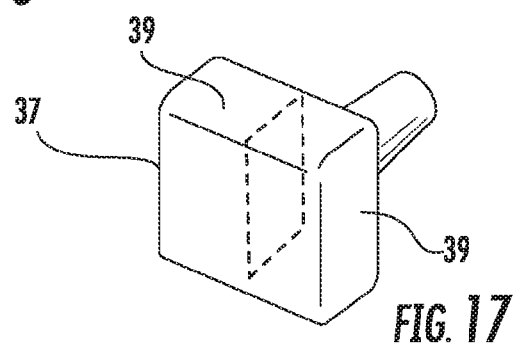
FIG. 17 is an upper right perspective view of the utility supply module illustrating a plurality of reservoirs within the utility supply module.

Whether engaged with an appliance, countertop stand, or a wall, the utility supplied to the feature module is typically limited to the capability of the supply line which the feature module 36 is connected to. For example, a water line that runs from a house supply line through the appliance may be limited to providing one liter of water per minute, based on the volumetric flow rate of the house supply line. However, a beverage machine of a feature module 36 may require one liter of water at high flow, thereby rendering the house supply undesirable. Therefore, a supplemental utility supply source is provided by engaging a utility supply module 37 to the feature module 36 (FIGS. 15-17). The utility supply module 37 includes a housing and at least one refillable reservoir 39 that is capable of storing a plurality of utilities. The utilities stored within the reservoir(s) 39 may include, for example, power or materials. Various reservoirs 39 may function as a variety of utility sources, including, but not limited to, a battery or fuel cell, a water tank (typically storing conditioned water), a gas cylinder containing gases commonly used in consumable storage environments, a powder or liquid chemical reactant, a desiccant, a flavorant, a heat sink, a pressure vessel providing vacuum or pneumatic pressure, or as an area to discharge (waste) storage coming from the feature module.

Figure 18:
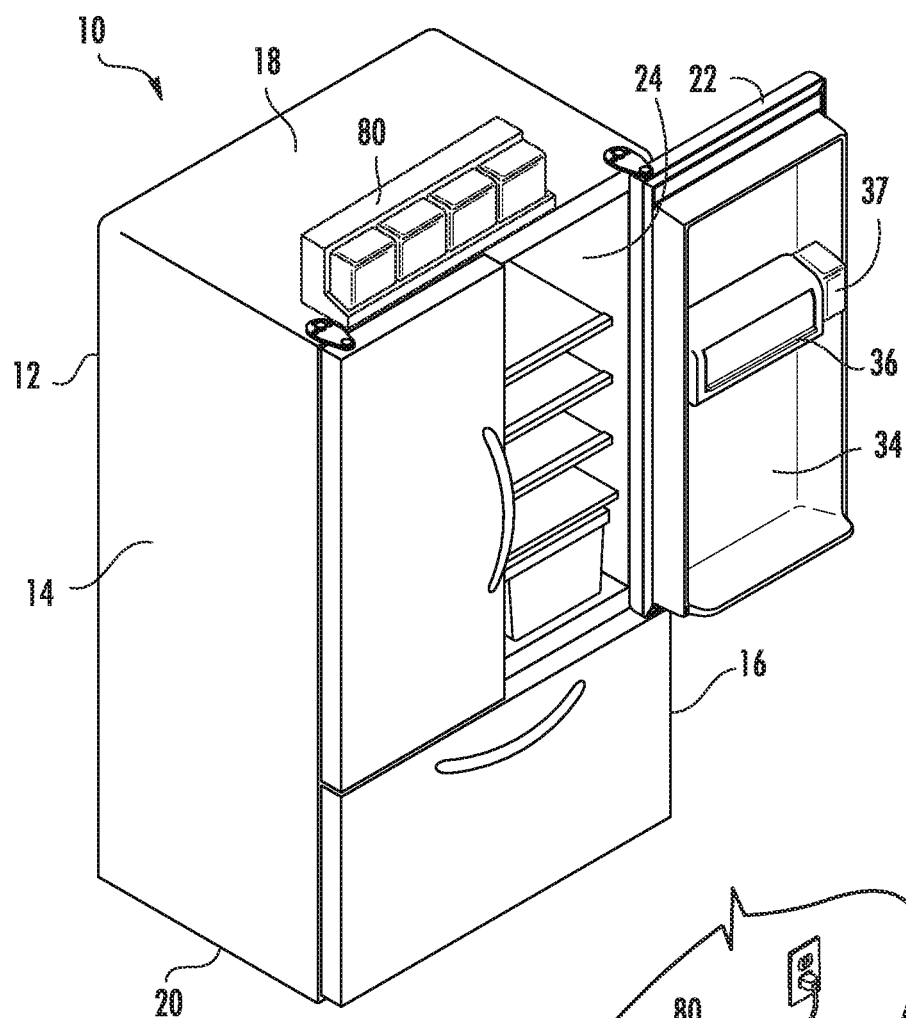
FIG. 18 is an upper right perspective view of the appliance modular system having a top cap structure charging station for charging at least one utility supply module.
Figure 19:
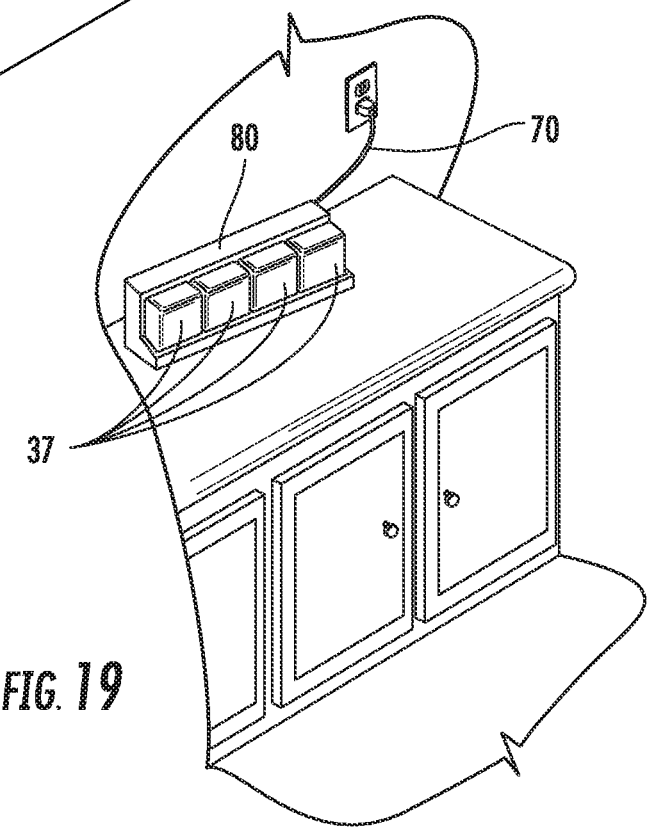
FIG. 19 is an upper left perspective view of a countertop charging station for charging at least one utility supply module.

The power or materials stored in each reservoir 39 may be done in a number of ways. Each reservoir 39 may be filled and refilled manually by a user, for example by simply pouring water into a reservoir 39 functioning as a water tank. Alternatively, a reservoir 39 may be filled on a charging station 80. Such a charging station 80 may be located remotely, such as on a countertop or wall mount (FIG. 19). The charging station 80 may also be conveniently located on an exterior surface of the appliance 10, such as a top cap structure on the top of the appliance 10 (FIG. 18). Another filling alternative involves a direct supply from the appliance 10, in the case where the utility supply module 37 is engaged directly to the appliance 10 and the appliance utility supply line (e.g., a residential water supply). This alternative provides the opportunity for the utility supply module 37 to replenish the reservoir(s) 39 while the feature module 36 is not operational, a time period the feature module does not require a utility. The direct supply alternative allows for the otherwise insufficient appliance utility supply line to provide the utility supply module reservoir(s) 39 with a constant utility supplement prepared for the feature module 36. Irrespective of the filling option, upon prompting from the feature module 36, the utility supply module 37 will have a stored utility supply available for provision to the feature module 36.

As is the case with the engagement of the feature module 36 to the appliance 10, the utility supply module 37 may be removably engageable with the appliance door 22 and sized to fit within the door liner 32 typically within the cavity or pocket 34 of the door liner 32. The door 22 would typically also include a connector, either a female connector or a male connector typically of the type discussed previously for the utility supply module 37. Similarly, connection in this manner may be made to a charging station 80 in the form of a countertop stand, a wall mounted bracket, or a top cap structure. Additionally, alternative connections and device recognition structures may be employed to identify which utility supply module 37 is engaged, as is the case with the connections described above for the feature module connections (i.e., signature resistance, comparator circuit, reed switch, dip switch, etc.). Such identification facilitates communication between the utility supply module 37 and the engaged structure, whether it be an appliance 10 or a charging station 80, thereby allowing the appropriate utility to be supplied from the source to the utility supply module 37. The engagement between the utility supply module 37 and the appliance 10 or charging station 80 results in the ability to transfer substances to the utility supply module 37, via a conduit or pathway that is established between the utility supply module 37 and the appliance 10 or charging station 80.

The feature module 36 is configured to engage the utility supply module 37 via a standardized utility connection or coupling 84, 86. The connection or coupling 84, 86 may also be similar to that described above for the engagement of the feature module 36 to the appliance 10 (i.e., signature resistance, comparator circuit, reed switch, dip switch), countertop stand 60, or wall mounted bracket 62, particularly the feature module recognition device, as well as the connection or coupling between the utility supply module 37 and the appliance 10 or charging station 80. Based upon the feature module recognition, the utility supply module 37 is capable of transferring utility to the feature module 36 in a similar fashion as that described above for transfer between the appliance 10 or charging station 80 and the utility supply module 37. Utilization of the modularity of both the feature module 36 and the utility supply module 37 allows a user to switch feature modules 36 and to position a feature module 36 at various locations within the appliance 10, thereby avoiding the need to have a utility supply hardwired directly into the feature module 36. The utility supply module 37 allow for quicker and/or longer supply of the utility to the feature module than can typically be obtained from the appliance alone or without the use of the utility supply module(s).

As noted above, the reservoirs 39 may function as a variety of utility sources and examples of particular applications will be described below, however, this functionality of the utility supply module reservoirs 39 is not intended to be limited to the following descriptions. First, a battery or fuel cell may obtain a "trickle" charge during non-use of the feature module 36, subsequently delivering a high wattage when prompted. A water tank may be supplied by an external line or a gravity feed, after which a complete deposit may be made to the engaged feature module 36. A gas cylinder containing gases that may be employed to manipulate a food, beverage, or other consumable storage environment, may incur a slow buildup of such gases in order to transfer the gases to the feature module 36. The reservoir 39 may serve as a heat sink, such as an insulated vessel that employs glycol or chilled water to provide a fast chill or quick thaw when required by the feature module 36. A pressure vessel may serve as a reserve chamber, or a surge tank on a well pump, in order to provide a vacuum or pneumatic pressure as needed by the feature module 36. Additionally, various food stuffs or flavorants may be stored in a reservoir 39 in order to restock the feature module 36. Finally, the reservoir 39 may serve as a powder or liquid chemical reactant, as well as a desiccant.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A connection system comprising:
a feature module;
an appliance;
a mounting surface of the appliance;
a connector disposed on the appliance adjacent to the mounting surface that is configured to removably engage the feature module in abutting contact with the mounting surface without the use of tools;
a utility port positioned adjacent to the mounting surface that is configured to deliver a plurality of utilities to the feature module, wherein the utility port is movable between an open position to allow one or more of the plurality of utilities to release and a closed position to prevent the plurality of utilities from releasing, and wherein the utility port is configured to remain in the closed position when the feature module is not engaged with the mounting surface;
a utility receiver disposed on the feature module that is configured to removably engage the utility port without the use of tools, wherein the utility receiver is configured to receive a select utility group of the plurality of utilities when the feature module is engaged with the mounting surface; and
a connection interface that is configured to detect when the feature module is engaged with the mounting surface and to detect the select utility group required by the engaged feature module, wherein after the feature module is engaged and the select utility group is detected, the connection interface moves the utility port to the open position to release the select utility group from the plurality of utilities to the feature module.

2. The connection system of claim 1, wherein the select utility group of the plurality of utilities is required to be received by the feature module to provide a functionality to a user not otherwise provided by the appliance.

3. The connection system of claim 1, wherein the select utility group of the plurality of utilities includes one or more of the plurality of utilities, and wherein the plurality of utilities includes at least one of the group consisting of electricity, fluid, gas, conditioned fluid, conditioned gas, chemical reactant, desiccant, foodstuff, flavorant, heat, cold air, pressurized air, and combinations thereof.

4. The connection system of claim 1, wherein the mounting surface includes an interior liner surface of the appliance, and wherein the interior liner surface includes a first side wall, a second side wall, a top, a bottom, and a door of the appliance.

5. The connection system of claim 1, wherein the mounting surface includes an interior liner surface of a door that is hingably coupled with a compartment of the appliance, and wherein a gap is created between a rear wall of the compartment and the feature module when the feature module is engaged and the door is in a closed position.

6. The connection system of claim 1, wherein the connector is integrally formed with the utility port.

7. The connection system of claim 1, wherein the utility port includes a plurality of outlets dispersed at multiple positions on the mounting surface, and wherein the outlets are configured to release one or more of the plurality of utilities.

8. The connection system of claim 1, wherein the connector of the appliance and the feature module include a protrusion and a recess, wherein the protrusion releasably and matingly engages the recess, and wherein either the recess or the protrusion is on the mounting surface.

9. The connection system of claim 1, wherein the connection interface includes a magnet embedded within the feature module and a reed switch embedded within the mounting surface, wherein the reed switch includes a pair of contacts having a default open position, wherein the reed switch is selectively positioned within the appliance, such that connection of the feature module to the appliance applies a magnetic field proximate the reed switch, resulting in a closed position between the pair of contacts, and wherein the closed position closes an electrical circuit within the appliance, thereby allows the transfer of the select utility group between the appliance and the feature module.

10. The connection system of claim 1, wherein the connection interface includes a dual in-line package switch having a plurality of switches that are positioned in a plurality of positions and a plurality of socket pins, wherein the appliance includes a plurality of pin sockets to receive the socket pins, and wherein specific setting combinations of the switches identifies the select utility group and allows the transfer of the select utility group between the appliance and the feature module.

11. The connection system of claim 10, wherein the connection interface includes at least one magnet, wherein the plurality of switches of the dual in-line package are a plurality of reed switches, each reed switch including a pair of contacts having a first position, and wherein connection of the feature module to the appliance applies a magnetic field proximate the reed switches, resulting in a second position for each pair of contacts, and wherein a specific combination of second positions closes an electrical circuit within the appliance, thereby enabling the transfer of the select utility group between the appliance and the feature module.

12. The connection system of claim 1, wherein the connection interface includes a module recognition device that has a computer control system operatively connected to the appliance, wherein the computer control system comprises a processor and a memory subsystem coupled to the processor where the memory subsystem stores code that, when executed based upon input received from the engaged feature module, initiates the transfer of the select utility group to be transferred between the appliance and the engaged feature module based upon the utilities required to be received by the feature module to provide a functionality to a user not otherwise provided by the appliance.

13. A connection system comprising:
    a feature module;
    a utility source;
    a connector disposed on the utility source that is configured to removably engage the feature module without the use of tools;
    a utility port on the utility source positioned adjacent to the connector that is configured to deliver a plurality of utilities to the feature module, wherein the utility port is configured to selectively allow one or more of the plurality of utilities to release and to selectively prevent one or more of the plurality of utilities from releasing;
    a utility receiver extending from the feature module that is configured to operably engage the utility port without the use of tools, wherein the utility receiver is configured to receive a select utility group of the plurality of utilities when the feature module is engaged with the utility source, wherein the select utility group is required to be received by the feature module to provide a functionality to a user that is not otherwise provided by the utility source; and
    a connection interface configured to detect when the feature module is engaged with the utility source and to detect the select utility group required by the engaged feature module, wherein after the feature module is engaged and the select utility group is detected the connection interface directs the utility port to release the select utility group from the plurality of utilities to the feature module and to prevent any remaining utilities of the plurality of utilities from releasing.

14. The connection system of claim 13, wherein the connector is integrally formed with the utility port, wherein the connection interface includes a magnet embedded within the feature module and a reed switch embedded within the connector, and wherein the reed switch is aligned with the magnet, such that connection of the feature module to the utility source applies a magnetic field proximate the reed switch, resulting in an electrical circuit closing within the utility source, thereby allowing the transfer of the select utility group between the utility source and the feature module.

15. The connection system of claim 13, wherein the utility port includes a plurality of outlets dispersed at multiple positions on a mounting surface, and wherein the outlets are configured to release one or more of the plurality of utilities.

16. The connection system of claim 13, wherein the select utility group of the plurality of utilities includes one or more of the plurality of utilities, and wherein the plurality of utilities includes at least one of the group consisting of electricity, fluid, gas, conditioned fluid, conditioned gas, chemical reactant, desiccant, foodstuff, flavorant, heat, cold air, pressurized air, and combinations thereof.

17. The connection system of claim 13, wherein the connector is positioned on a mounting surface of the utility source defined by an interior liner surface of an appliance that includes a first side wall, a second side wall, a top, a bottom, and a door of the appliance, and wherein the feature module includes a housing defining an enclosed interior space accessible via an access door that provides functionalities.

18. A method of providing a user-selected functionality to a user not otherwise provided by an appliance comprising:
    providing an appliance configured to transfer a plurality of utilities to a feature module via a connection system, wherein the feature module is configured to be removably engaged to a mounting surface of an appliance without the use of tools and is capable of supplying at least one functionality by using a select utility group of the plurality of utilities;
    engaging the feature module with the mounting surface of the appliance by hand without the use of tools such that the appliance and the feature module are removably engaged with one another and are operably connected at a connection interface;
    detecting whether the feature module is connected to the appliance using a detection and communication device of the connection interface;
    determining which of the plurality of utilities is the select utility group to be transferred between the feature module and the appliance via the connection system when the feature module is engaged to the appliance, using the detection and communication device of the connection interface;
    transferring the select utility group of the plurality of utilities identified by the detection and communication device upon engagement of the feature module to the appliance to provide the user-selected functionality that is capable of being supplied by the feature module; and
    removing the feature module from the appliance by disengaging the feature module at the connection interface from the mounting surface of the appliance.

19. The method of claim 18, wherein the step of engaging the feature module with the mounting surface includes coupling the feature module with a utility port positioned adjacent to the mounting surface that is configured to deliver the plurality of utilities to the feature module, wherein the utility port is movable between an open position to allow one or more of the plurality of utilities to release and a closed position to prevent the plurality of utilities from releasing, and wherein the utility port is configured to remain in the closed position when the feature module is not engaged with the mounting surface.

20. The method of claim 18, wherein the steps of detecting whether the feature module is connected and determining which of the plurality of utilities is the select utility group includes the detection and recognition device, which is chosen from the group consisting of a reed switch, a DIP switch, and a comparator circuit, and wherein the detection and recognition device detects different functionalities chosen from the group consisting of ice making, ice crushing, water dispensing, precise temperature control, humidity control, vacuum packaging, thawing, and fast chilling.

\* \* \* \* \*